(12) United States Patent
Van Der Linden et al.

(10) Patent No.: US 8,145,668 B2
(45) Date of Patent: Mar. 27, 2012

(54) ASSOCIATING INFORMATION RELATED TO COMPONENTS IN STRUCTURED DOCUMENTS STORED IN THEIR NATIVE FORMAT IN A DATABASE

(75) Inventors: Robbert Van Der Linden, Scotts Valley, CA (US); Brian S. Vickery, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 12/270,821

(22) Filed: Nov. 13, 2008

(65) Prior Publication Data

US 2009/0077625 A1  Mar. 19, 2009

Related U.S. Application Data

(63) Continuation of application No. 11/016,107, filed on Dec. 17, 2004, now Pat. No. 7,519,574, and a continuation-in-part of application No. 10/648,760, filed on Aug. 25, 2003.

(51) Int. Cl.
*G06F 17/30* (2006.01)
*G06F 17/00* (2006.01)

(52) U.S. Cl. ........ 707/778; 707/711; 707/715; 707/716; 707/741

(58) Field of Classification Search .................. 707/711, 707/715–716, 741, 778
See application file for complete search history.

(56) References Cited

U.S. PATENT DOCUMENTS

| | | | |
|---|---|---|---|
| 4,907,151 A | 3/1990 | Bartlett | |
| 5,193,184 A | 3/1993 | Belsan et al. | |
| 5,283,830 A | 2/1994 | Hinsley et al. | |
| 5,412,807 A | 5/1995 | Moreland | |
| 5,561,786 A | 10/1996 | Morse | |
| 5,644,776 A | 7/1997 | DeRose et al. | |
| 5,652,858 A | 7/1997 | Okada et al. | |
| 5,671,403 A | 9/1997 | Shekita et al. | |
| 5,673,334 A | 9/1997 | Nichani et al. | |
| 5,758,361 A | 5/1998 | van Hoff | |
| 5,787,449 A | 7/1998 | Vulpe et al. | |
| 5,878,415 A | 3/1999 | Olds | |
| 5,893,086 A | 4/1999 | Schmuck et al. | |

(Continued)

FOREIGN PATENT DOCUMENTS

EP    0992873    4/2000

(Continued)

OTHER PUBLICATIONS

Kanne et al.; Efficient Storage of XML Data, pp. 1-20. University of Mannheim, Germany dated Jun. 16, 1999.

(Continued)

*Primary Examiner* — Yicun Wu

(74) *Attorney, Agent, or Firm* — Sawyer Law Group, P.C.

(57) ABSTRACT

A system for associating information related to a component of a structured document that is stored in its native format in a database system includes generating a hierarchical node tree comprising a plurality of nodes, where each node represents a component in the structured document, and generating a path associated with each node, where the path follows the hierarchical structure of the structured document from a root node to the node. In each node, an identifier associated with the path is stored. A table is provided that correlates the identifier with information related to the associated path. The information applies to the component represented by the node.

21 Claims, 4 Drawing Sheets

U.S. PATENT DOCUMENTS

| | | | |
|---|---|---|---|
| 5,920,861 | A | 7/1999 | Hall et al. |
| 5,995,952 | A | 11/1999 | Kato |
| 6,044,373 | A | 3/2000 | Gladney et al. |
| 6,081,810 | A | 6/2000 | Rosenzweig et al. |
| 6,085,193 | A | 7/2000 | Malkin et al. |
| 6,101,558 | A | 8/2000 | Utsunomiya et al. |
| 6,236,996 | B1 | 5/2001 | Bapat et al. |
| 6,237,099 | B1 | 5/2001 | Kurokawa |
| 6,249,844 | B1 | 6/2001 | Schloss et al. |
| 6,308,173 | B1 | 10/2001 | Glasser et al. |
| 6,334,130 | B1 | 12/2001 | Tada et al. |
| 6,336,114 | B1 | 1/2002 | Garrison |
| 6,366,934 | B1 | 4/2002 | Cheng et al. |
| 6,381,602 | B1 | 4/2002 | Shoroff et al. |
| 6,421,656 | B1 | 7/2002 | Cheng et al. |
| 6,438,576 | B1 | 8/2002 | Huang et al. |
| 6,457,103 | B1 | 9/2002 | Challenger et al. |
| 6,480,865 | B1 | 11/2002 | Lee et al. |
| 6,487,566 | B1 | 11/2002 | Sundaresan |
| 6,502,101 | B1 | 12/2002 | Verprauskus et al. |
| 6,519,597 | B1 | 2/2003 | Cheng et al. |
| 6,584,458 | B1 | 6/2003 | Millett et al. |
| 6,631,371 | B1 | 10/2003 | Lei et al. |
| 6,658,652 | B1 | 12/2003 | Alexander, III et al. |
| 6,798,776 | B1 | 9/2004 | Cheriton et al. |
| 6,820,082 | B1 | 11/2004 | Cook et al. |
| 6,836,778 | B2 | 12/2004 | Manikutty et al. |
| 6,853,992 | B2 | 2/2005 | Igata |
| 6,901,410 | B2 | 5/2005 | Marron et al. |
| 6,922,695 | B2 | 7/2005 | Skufca et al. |
| 6,938,204 | B1 | 8/2005 | Hind et al. |
| 6,947,945 | B1 | 9/2005 | Carey et al. |
| 6,959,416 | B2 | 10/2005 | Manning et al. |
| 7,016,915 | B2 | 3/2006 | Shanmugasundaram et al. |
| 7,031,962 | B2 | 4/2006 | Moses |
| 7,043,487 | B2 | 5/2006 | Krishnamurthy et al. |
| 7,353,222 | B2 | 4/2008 | Dodds et al. |
| 7,478,337 | B2 * | 1/2009 | Kodosky et al. ............... 715/771 |
| 7,493,603 | B2 | 2/2009 | Fuh et al. |
| 7,756,857 | B2 * | 7/2010 | Wan .............................. 707/715 |
| 7,818,666 | B2 * | 10/2010 | Dorsett et al. ................ 715/237 |
| 2001/0018697 | A1 | 8/2001 | Kunitake et al. |
| 2002/0038319 | A1 | 3/2002 | Yahagi |
| 2002/0099715 | A1 | 7/2002 | Jahnke et al. |
| 2002/0103829 | A1 | 8/2002 | Manning et al. |
| 2002/0111965 | A1 | 8/2002 | Kutter et al. |
| 2002/0112224 | A1 | 8/2002 | Cox |
| 2002/0123993 | A1 | 9/2002 | Chau et al. |
| 2002/0133484 | A1 | 9/2002 | Chau et al. |
| 2002/0156772 | A1 | 10/2002 | Chau et al. |
| 2002/0156811 | A1 | 10/2002 | Krupa |
| 2002/0169788 | A1 | 11/2002 | Lee et al. |
| 2003/0014397 | A1 | 1/2003 | Chau et al. |
| 2003/0028495 | A1 | 2/2003 | Pallante |
| 2003/0204515 | A1 | 10/2003 | Shadmon et al. |
| 2003/0208490 | A1 | 11/2003 | Larrea et al. |
| 2004/0044959 | A1 | 3/2004 | Shanmugasundaram et al. |
| 2004/0128615 | A1 | 7/2004 | Carmel et al. |
| 2004/0193607 | A1 | 9/2004 | Kudo et al. |
| 2004/0243553 | A1 | 12/2004 | Bailey |

FOREIGN PATENT DOCUMENTS

| | | |
|---|---|---|
| WO | WO 03/030031 | 4/2003 |
| WO | WO/2004/036417 | 4/2004 |

OTHER PUBLICATIONS

Chilimbi, Trishui M. et al., "Cache-Conscious Structure Layout," ACM 1999, pp. 1-12.

Park, Sangwon et al., "XML Query Processing Using Signature and DTD," E-Commerce and Web Technologies, Sep. 2-6, 2002, pp. 162-171.

Park, Sangwon et al., "A New Query Processing Technique for XML Based on Signature," IEEE Apr. 18-21, 2001, pp. 22-29.

Park, Sangwon et al., "SigDAQ: an Enhanced XML Query Optimization Technique," The Journal of Systems and Software, No. 61, No. 2, Mar. 15, 2002, pp. 91-103.

Roth, Amir, et al., "Dependence Based Prefetching for Linked Data Structures," ACM 1998, pp. 115-126.

Shuf, Yefim, et al., "Creating and Preserving Locality of Java Applications at Allocation and Garbage Collection Times," ACM 2002, pp. 13-25.

Yang, Siuxi et al., "Speeding Up the Memory Hierarchy in Flat COMA Multiprocessors," IEEE, Feb. 1-5, 1997, pp. 4-13.

E. Damiani, S. De Capitani Di Vimercati, S. Paraboschi, P. Samarati, "Design and implementation of an access control processor for XML documents". Computer Networks 22 (2000) pp. 59-75. Published Jun. 2000.

E. Damiani, S. De Capitani Di Vimercati, S. Paraboschi, P. Samarati, "A Fine-Grained Access Control System for XML Documents". ACM Transactions on Information and System Security, vol. 5, No. 2, pp. 169-202. Published May 2002.

Masatoshi Yoshikawa et al., "Xrel: A Path-Based Approach to Storage and Retrieval of XML Documents Using Relation Databases," Japan, ACM 2001.

Lin Guo et al., "XRANK: Ranked Keyword Search over XML Documents," ACM, SIGMOD 2003, Jun. 9-12, 2003, San Diego, CA.

V. Christophides et al., "Querying Structured Documents with Hypertext Links using Oodbms," France, ACM 1998.

* cited by examiner

| Path ID 602 | Path 604 | Access Control 606 | Schema Type 608 | Statistics 610 | Misc. 612 |
|---|---|---|---|---|---|
| 001 | /bib | [$User='Murata' or $User='Seki' or $User='Tozawa'] | | | |
| 002 | /bib/@ver | [$User='Murata'] | | | |
| 003 | /bib/text() | [$User='Murata' or $User='Seki'] | | | |
| 004 | /bib/book | [($User='Murata' or $User='Tozawa') and not($User='Hada')] | | | |
| 005 | /bib/book/text() | [$User='Murata' and not($User='Hada')] | | | |
| 006 | /bib/book/@year | [$User='Murata' and not($User='Hada')] | | | |
| 007 | /bib/book/title | if !p then [ref(1, ../../)] | | | |
| 008 | /bib/book/title/text() | if !p then [ref(1, ../../../)] | | | |

ASSOCIATING INFORMATION RELATED TO COMPONENTS IN STRUCTURED DOCUMENTS STORED IN THEIR NATIVE FORMAT IN A DATABASE

CROSS REFERENCE TO RELATED APPLICATIONS

Under 35 USC §120, this application is a continuation application and claims the benefit of priority to U.S. patent application Ser. No. 11/016,107, filed Dec. 17, 2004, entitled "ASSOCIATING INFORMATION RELATED TO COMPONENTS OF A STRUCTURED DOCUMENT STORED IN ITS NATIVE FORMAT IN A DATABASE", which is a continuation-in-part of U.S. patent application Ser. No. 10/648,760, filed Aug. 25, 2003, entitled "METHOD AND SYSTEM FOR STORING STRUCTURED DOCUMENTS IN THEIR NATIVE FORMAT IN A DATABASE" all of which is incorporated herein by reference.

BACKGROUND

Embodiments of the present invention relate to storing and accessing information in a structured document in a computer implemented database system.

Structured documents have nested structures, i.e., structures that define hierarchical relationships between components of a document. Documents written in Extensible Markup Language (XML) are structured documents. XML is quickly becoming the standard format language for exchanging information over the Internet because it allows the user to design a customized markup language for many classes of structured documents. For example, a business can easily model a complex structure of a document, such as a purchase order, in a form written in XML and send the form for further processing to its business partners. XML supports user-defined tags for better description of nested document structures and associated semantics, and encourages the separation of document content from browser presentation.

As more and more business applications use structured documents written in XML to present and exchange data over the Internet, the challenge is to store, search, and retrieve these documents using existing relational database systems. A relational database management system (RDBMS) is a database management system which uses relational techniques for storing and retrieving data. Relational databases are organized into tables, which consist of rows and columns of data. A database will typically have many tables and each table will typically have multiple rows and columns. The tables are typically stored on direct access storage devices (DASD), such as magnetic or optical disk drives, for semi-permanent storage.

Some relational database systems store an XML document as a Binary Large Object (BLOB). While storing the document as a BLOB is straightforward, accessing the data in the document presents challenges because a BLOB is not easily queried. For example, each BLOB must be read and parsed before it can be queried. For a large number of BLOBs, this process can be prohibitively costly and time consuming.

Other relational database systems store an XML document by mapping the XML data to rows and columns in one or more relational tables. This approach, however, introduces inefficiencies, especially for large XML documents. For example, mapping an XML document to a relational database can result in a large table having numerous columns with null values (which consumes valuable memory) or a large number of tables (which is inefficient and consumes memory).

Moreover, neither approach provides a way to store information related to the document data, e.g., metadata, that does not introduce significant inefficiencies and require significant resources. Furthermore, neither approach preserves the nested structure of the document. Thus, parent-child(ren) relationships are difficult to reconstruct.

Accordingly, it is desirable to be able to store structured documents in their native formats within a database system. It is also desirable to associate related information with components of structured documents. It is also desirable to integrate structured documents into an existing database system in order to use the existing resources of a database system.

SUMMARY

A system for associating information related to a component of a structured document that is stored in its native format in a database system includes generating a hierarchical node tree comprising a plurality of nodes, where each node represents a component in the structured document, and generating a path associated with each node, where the path follows the hierarchical structure of the structured document from a root node to the node. In each node, an identifier associated with the path is stored. A table is provided that correlates the identifier with information related to the associated path. The information applies to the component represented by the node.

DRAWINGS

These features, aspects and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

FIG. 6 illustrates an exemplary path table according to a version of the present invention.

DESCRIPTION

Embodiments of the present invention relate to storing and accessing information in a structured document in a computer implemented database system. Various modifications to the preferred embodiment and the generic principles and features described herein will be readily apparent to those skilled in the art. For example, the following discussion is presented in the context of a DB2® database environment available from IBM® Corporation. It should be understood, however, that the present invention is not limited to DB2 and may be implemented with other relational database systems or with other native XML database systems. Thus, the present invention is to be accorded the widest scope consistent with the principles and features described herein.

Figure 1:
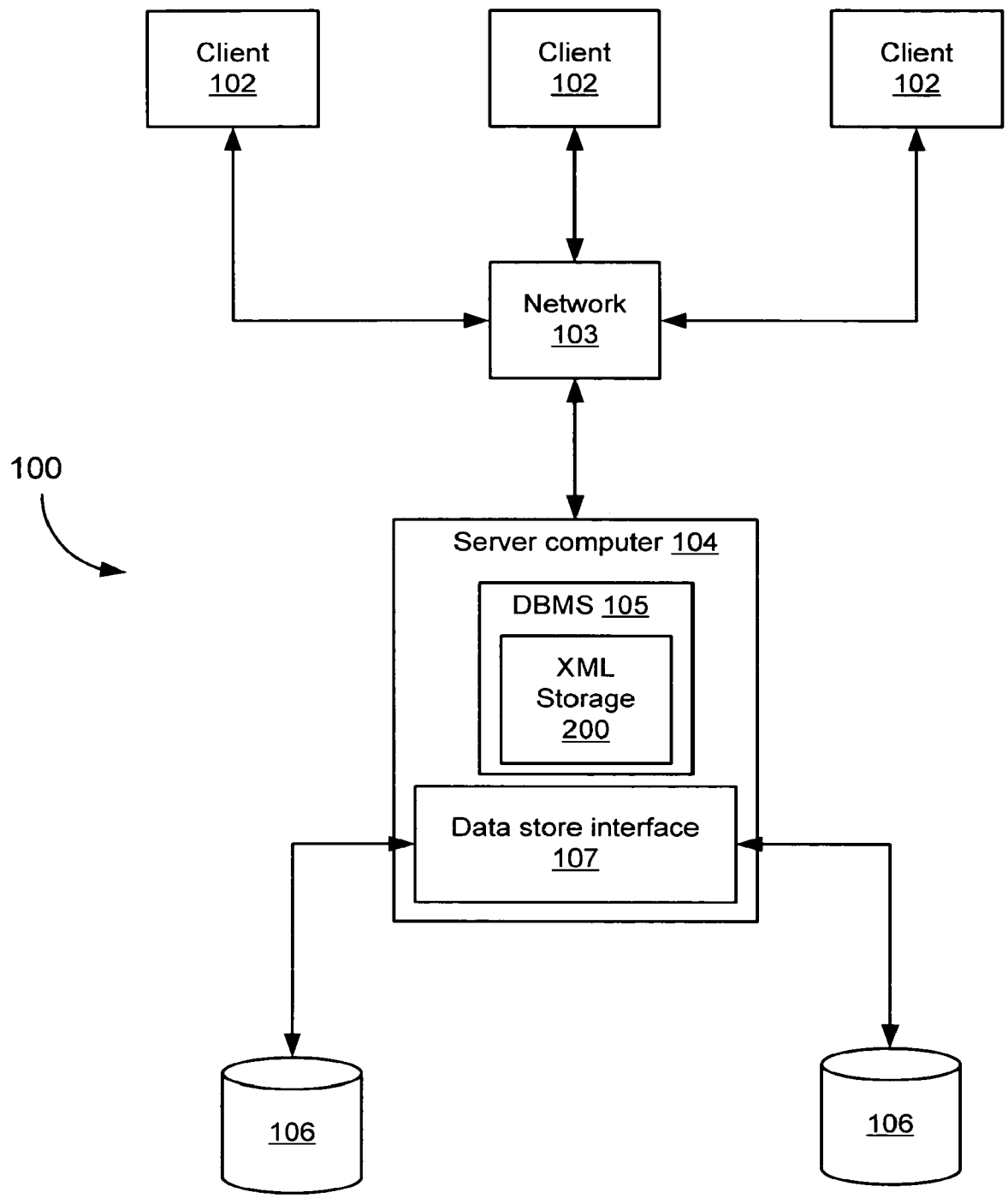
FIG. 1 is a block diagram of exemplary computer hardware that can be used to implement the present invention.

An exemplary computer hardware environment that can be used with the present invention is illustrated in FIG. 1. A distributed computer system 100 utilizes a network 103 to connect client computers 102 executing client applications to a server computer 104 executing software and other computer programs, and to connect the server computer 104 to data sources 106. These components can be coupled to one another by various networks, including LANs, WANs, and the Internet. Each client computer 102 and the server computer 104 additionally comprises an operating system and one or more computer programs (not shown).

The server computer 104 uses a data store interface 107 for connecting to the data sources 106. The data store interface can be connected to a database management system (DBMS) 105, which supports access to the data store 106. The DBMS 105 can be a relational database management system (RDBMS), such as the DB2® system developed by IBM Corporation, or it also can be a native XML database system. The interface and DBMS 105 can be located at the server computer 104 or may be located on one or more separate machines. The data sources 106 may be geographically distributed.

The DBMS 105 and the instructions derived therefrom all comprise of instructions which, when read and executed by the server computer 104 cause the server computer 104 to perform the steps necessary to implement and/or use the present invention. Those skilled in the art will recognize that the exemplary environment illustrated in FIG. 1 is not intended to limit the present invention, and that alternative environments may be used without departing from the scope of the present invention.

According to one version, the DBMS 105 includes an XML Storage mechanism 200 that supports the storage of XML documents in their native format on disk. Storing data "on disk" refers to storing data persistently, for example, in the data store 106.

Figure 2:
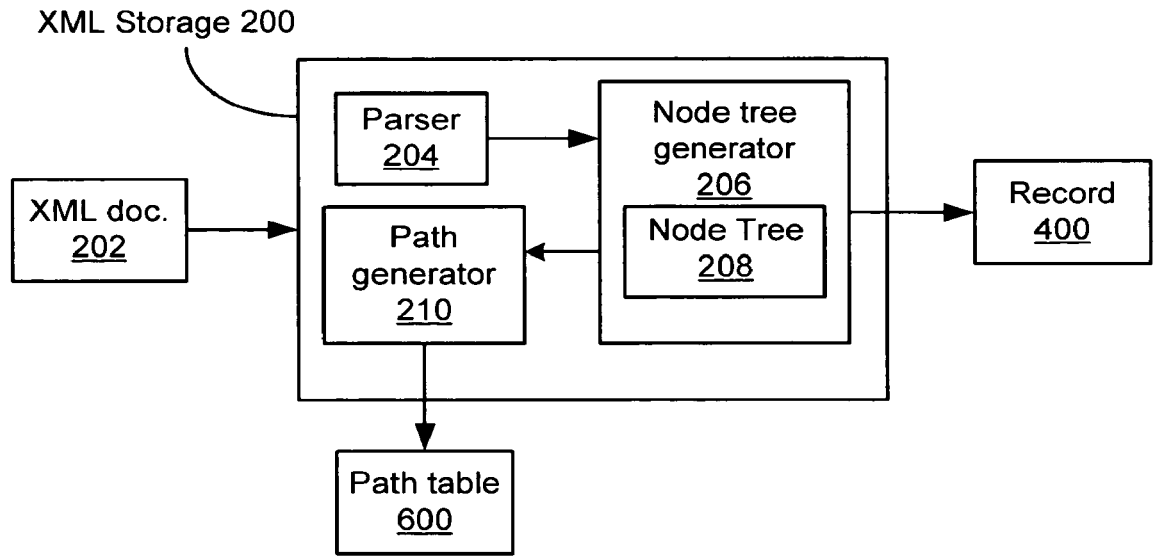
FIG. 2 is a block diagram of an XML Storage mechanism according to a version of the present invention.

FIG. 2 is a block diagram of the XML Storage mechanism 200 according to a version of the present invention. The XML Storage mechanism 200 comprises a parser 204, a node tree generator 206 and a path generator 208.

Typically, a structured document can be represented by a plurality of nodes. The term "node" is used in the Direct Object Model (DOM)-sense, which is a standard XML construct well known to those skilled in the art. In that construct, each node corresponds to a component of the XML document. The component can be an element, an attribute, a value, or other XML construct. The parser 204 interprets the structured document and identifies its node components. The node tree generator 206 receives the nodes representing the XML document and forms a hierarchical node tree 208.

Each node of the XML document can be described by a path that defines the hierarchical relationship between the node and its parent node(s). Every path begins at a root node corresponding to a root element and follows the hierarchical structure defined by the XML document. The path generator 210 generates a path for each node in the node tree 208.

Figure 3:
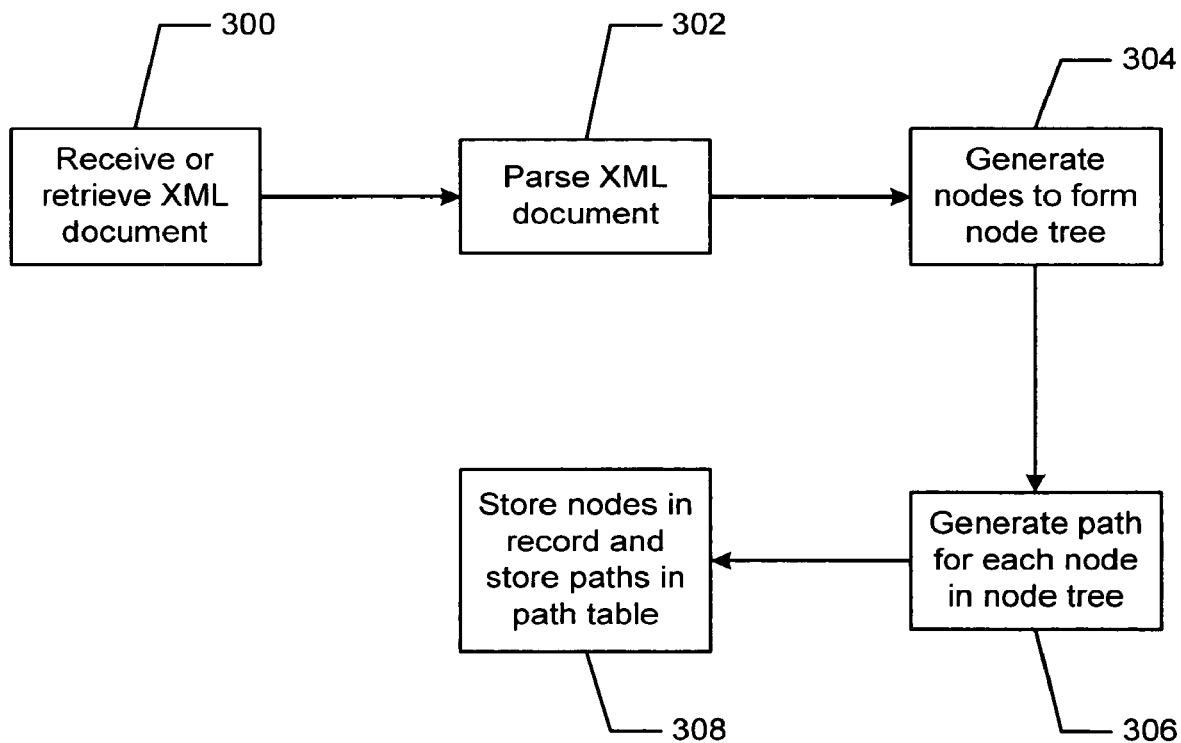
FIG. 3 is a high level flowchart illustrating a process for storing XML documents in their native format in a database according to a version of the present invention.

FIG. 3 is a flowchart illustrating a method for storing XML documents in their native format in a database according to a version of the present invention. Referring to FIG. 2 and FIG. 3, the XML Storage mechanism 200 receives or retrieves an XML document 202 for storage (step 300). The XML document 202 is parsed by the parser 204, e.g., a standard SAX (Simple API for XML) parser (step 302).

Next, the node tree generator 206 takes the parsed XML data and generates a plurality of nodes that form the hierarchical node tree 208 that represents the XML document (step 304). For example, suppose a structured document 202 is as follows:

```
<Questionnaire>
    <Name> Alice </Name>
    <Questions>
        <Q1> Yes </Q1>
        <Q2> No </Q2>
    </Questions>
<Questionnaire>
```

The node tree 208 would comprise the following element nodes:

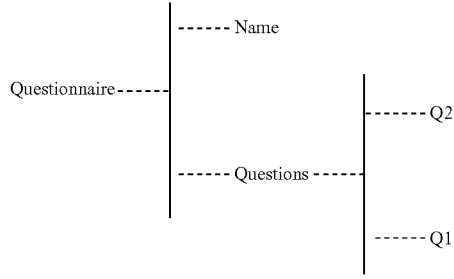

The node tree 208 preserves the hierarchical structure of the XML document 202 and also preserves the document order, i.e., the order of the nodes.

After the node tree 208 is generated, the path generator 210 creates a path for each node in the node tree 208 (step 306). Thus, referring to the example above, the path for node Q1 can be:

/Questionnaire/Questions/Q1

The plurality of nodes forming the node tree 208 is stored in an XML Record 400 and the paths are stored in a path table 600 (step 308). The path table 600 is preferably a standard relational table, e.g., with rows and columns, that is stored in the database 106 (FIG. 1).

The XML Record 400 is similar to a standard database record that stores relational data except that the XML Record 400 stores XML data. Storing the plurality of nodes in a record 400 is advantageous for several reasons. A record 400, like an XML document, is variable in length. Records 400 also can be re-directed, providing a layer of indirection that insulates pointers into a tree, from e.g., within the tree itself, from indices, or from an anchor table (described below), if the record 400 is moved to a different page. Moreover, the infrastructure for fixed page buffer management, recovery, utilities (backup/restore), logging, locking, and replication can be reused.

Figure 4:
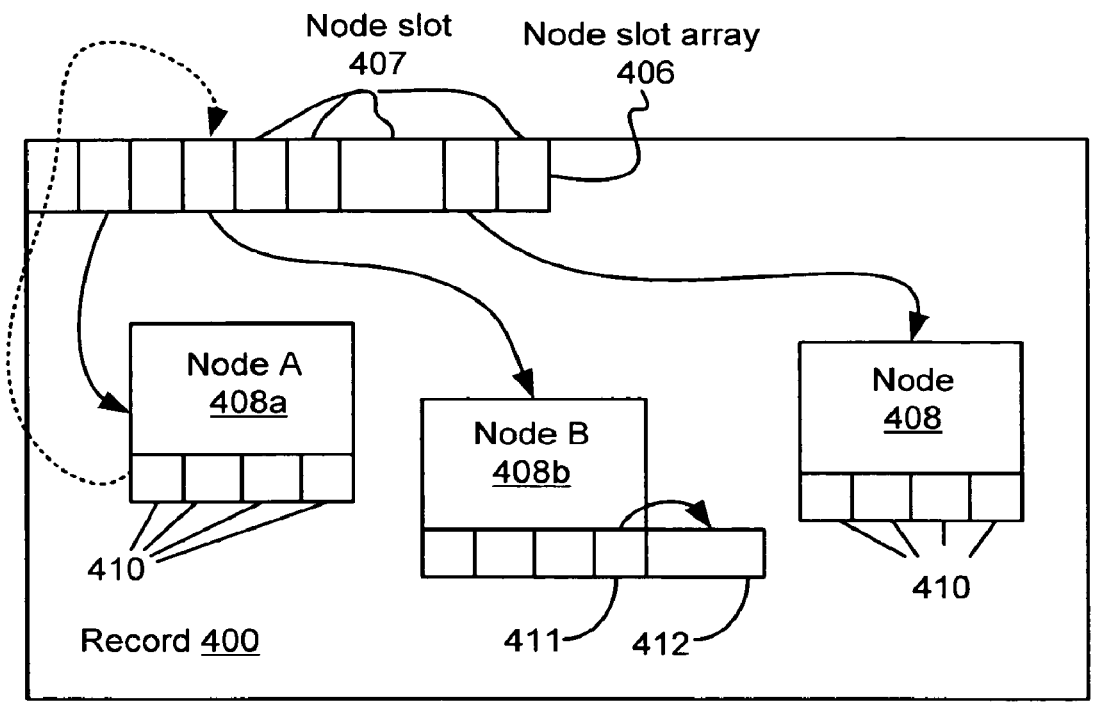
FIG. 4 is a block diagram of an XML Record according to a version of the present invention.

FIG. 4 is a block diagram of an XML Record 400 according to a version of the present invention. As is shown, the XML Record 400 comprises a node slot array 406 and a plurality of nodes 408a, 408b, 408 representing at least one XML document 202. Each entry in a node slot 407 points to a node, e.g., 408, in the node tree 208.

As is shown, each node 408, 408a, 408b comprises an array of child pointers 410. Each child pointer 410 generally points to a node slot 407, which in turn, points to a node, e.g., 408b, corresponding to the child. Thus, for example, Node B (408b) is the child node of Node A (408a). Child pointers 410 can be small because they only need to point to a node slot 407. In certain circumstances a child pointer, e.g., 411, will point to an in-lined character array 412 in the same node, e.g., 408*b*. The in-lined character array 412 contains information describing the child. In other circumstances, the child pointer 410 itself will comprise information describing the child and its value, i.e., it points to itself.

Figure 5:
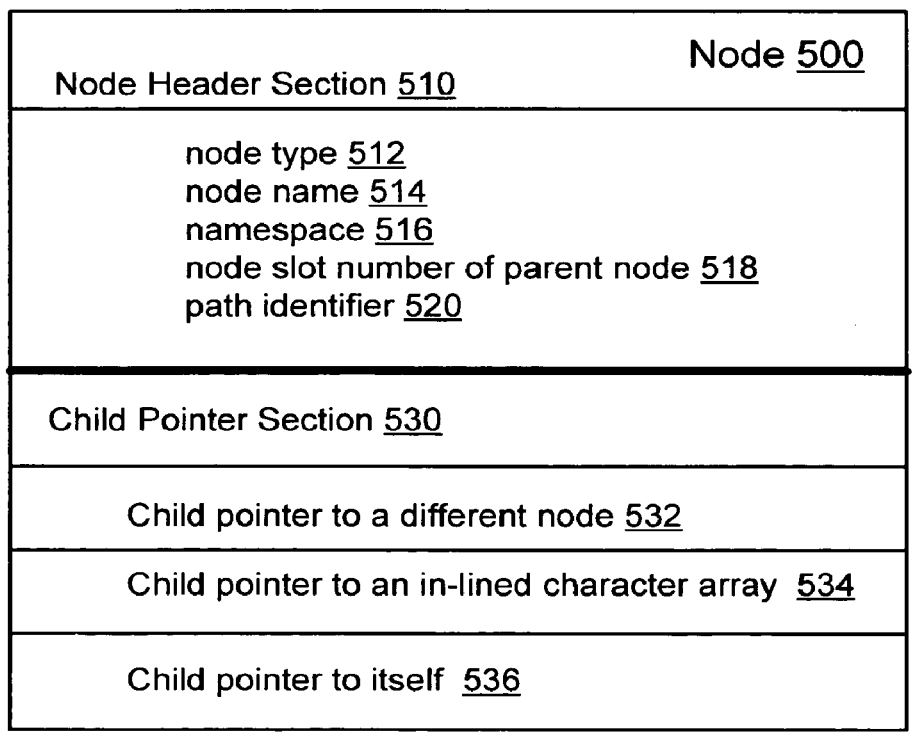
FIG. 5 is a block diagram of a node according to a version of the present invention.

The structure and contents of the node will now be described with reference to FIG. 5, which is a block diagram of a node 500 according to a version of the present invention. The node 500 is generally divided into two sections, a node header section 510 and a child pointer section 530. The node header section 510 comprises:

The node type 512;
The name of the node 514;
The namespace of this node 516;
Node slot number of the parent node 518; and
A Path Identifier 520.

The node type 512 identifies what component the node 500 represents in the XML document 202. The node type (512) is typically an element, attribute, processing instruction or text node, although those skilled in the art recognize that other less common node types exist. The node name (514) is typically the element or attribute name, or processing instruction target. The namespace of the node (516) is the namespace of the element or attribute. The node slot number of the parent node (518) allows the node 500 to identify its parent node for navigation purposes. The path identifier 520, which correlates to a path, identifies the path that is associated with the node.

The child pointer section 530 comprises at least three formats. The format for a child pointer 410 depends on where the child node resides, e.g., in a separate node (408*b*) or in the parent node (408*a*). The first format (532) applies when the child pointer, e.g., 410*a*, points to an ordered attribute, or internal child in a different node (e.g., 408*b*). Generally, the node type of such a child will be of an element or attribute type. The second format (534) applies when the child pointer 410 points to an ordered attribute or internal child in an in-lined character array 412 in the node (e.g., 408*b*). Here, the child is part of its parent node. The third format (536) is applied when the child pointer 410 itself fully describes the child and its value.

In this version, each node 500 is relatively small because it includes minimal information about itself, e.g., its component type, its name, its parent, as well as minimal information about its children. This is desirable because a node tree 208 can comprise hundreds or thousands of nodes 500 and those nodes 500 preferably can be stored in as few records 400 as possible for purposes of performance and efficiency.

In certain circumstances, e.g., during query processing, other information related to the node 500 is desirable or required. Typically such related information is associated with the node's path because more than one node 500 can share the same path. For example, access control rules (ACRs) restrict access to the document 202 or portions of the document 202 to authorized users. Fine-grained ACRs control access at the node-level and are typically defined by the paths associated with the nodes 500. Similarly, schema information and statistical data, e.g., distribution statistics, related to the node 500 are also generally associated with the node's path. Nevertheless, during querying, such related information is difficult to access because the path of a node 500 cannot readily be determined.

According to one version of the present invention, a reference to the node's path is stored in the node 500 itself in the form of the path identifier 520. Information related to the node's path is stored in the path table 600 along with the path identifier 520 associated with the path. Thus, the path identifier 520 provides a link between the node 500 and the path table 600 where information related to the node's path is stored. Consequently, during querying, the DBMS 105 can quickly retrieve the associated information of a node 500.

FIG. 6 is an exemplary path table for an exemplary XML document according to one version of the present invention. The exemplary XML document comprises:

```
<bib ver="1.0">
    <book year="1994">
        <title>TCP/IP Illustrated</title>
    </book>
    <book year="2002">
        <title>Advanced Programming in the Java environment</title>
    </book>
</bib>
```

The table 600 comprises a path identifier column 602, a path column 604, and several columns for information related to all nodes with the same path identifier, e.g., the node 500 associated with the path identifier 602 and path 604. For example, an access control column 606 contains access control information pertaining to each node 500 via the path identifier 602. In one version, the access control column 604 comprises value expressions derived from an access control policy for the document 202. Each value expression is a statement that determines whether a requester is authorized to access the path to the node 500. The value expression is preferably compiled before it is stored in the path table 600 and therefore the DBMS 105 can execute the value expression at runtime to perform access control checking for a particular node 500.

In addition, the path table 600 can include a schema type column 608 that includes a reference to a schema component of an XML Schema corresponding to the XML document 202. Schema components of an XML Schema are well known in the art and are defined at www.w3.org (XML Schema standard). Preferably, the XML schema document is registered and stored in the DBMS 105 in a format such that its components can be identified.

The path table 600 can also include a statistics column 610 that contains information related to the node's path that can be used by the DBMS 105 to optimize execution plans. For example, the statistical information can include distribution statistics that indicate within what range values fall, the number of entries that include the value, and other information that help the DBMS 105 to create efficient execution plans. The statistical information in the statistics column 610 is preferably stored as a binary large object (BLOB).

The path table 600 can also include other columns, e.g., a miscellaneous column 612, that contain other types of information related to the node's path. Accordingly, detailed information pertaining to a node 500 can be captured and easily associated with the node 500 via the path identifier 602 without increasing the size of the node 500. While navigating a structured document 202, e.g., during query execution, the DBMS 105 can access information related to any node 500 it traverses by looking up the path identifier 602 of the node 500 in the path table 600.

Embodiments of the present invention associate information related to data in a structured document stored in its native format in a computer implemented database. Through the aspects of the present invention, a structured document is parsed and a hierarchical node tree comprising a plurality of nodes is generated from the parsed data. Each node represents a component in the structured document and includes a path identifier. The path identifier is used to directly locate in a path table information related to the node during the querying process.

The present invention has been described with reference to certain preferred versions thereof; however, other versions are possible. For example, the storage mechanism 200 can be used for any structured document and is not restricted to XML documents, as would be apparent to one of ordinary skill. Other configurations of the path table can also be used. For example, the path table is not limited to the types of information illustrated in FIG. 6 and other types of information related to the node can be stored in the path table. Further, alternative steps equivalent to those described for the storage method can also be used in accordance with the parameters of the described implementation, as would be apparent to one of ordinary skill. Therefore, the spirit and scope of the appended claims should not be limited to the description of the preferred versions contained herein.

What is claimed is:

1. A computer readable storage medium containing programming instructions that, when executed by a computer, cause the computer to perform a method of associating information related to a component in a structured document that is stored in its native format in a database system comprising instructions for:
    a) generating a node slot array and a hierarchical node tree, wherein the hierarchical node tree comprises a plurality of nodes, wherein each node represents a component in the structured document, wherein each node comprises a header section and a child pointer section, wherein the child pointer section comprises a plurality of child pointers to minimize node size, and wherein at least one child pointer points to a node slot within the node slot array, which in turn, includes an entry which points to a node corresponding to the child node;
    b) for each node, generating a path associated with the node, wherein the path follows the hierarchical structure of the structured document from a root node to the node;
    c) storing in each node an identifier associated with the path for the node; and
    d) providing a table that correlates the identifier with the information related to the associated path, wherein the information applies to the component represented by the node.

2. The computer readable medium according to claim 1 wherein generating the hierarchical node tree comprises:
    a1) parsing the structured document into the plurality of nodes; and
    a2) linking each of the nodes via pointers to form the hierarchical node tree.

3. The computer readable medium according to claim 1 further comprising:
    e) storing each node in at least one record in the database, wherein each record comprises a plurality of node slots and each node slot includes a pointer pointing to a node of the plurality of nodes.

4. The computer readable medium according to claim 1 wherein a node has at least one child node and comprises at least one child pointer that points to each of the child nodes.

5. The computer readable medium according to claim 1 further comprising:
    e) storing the identifier in the table.

6. The computer readable medium according to claim 5 further comprising:
    f) storing the path in the table; and
    g) correlating the identifier with the path associated with the node.

7. The computer readable medium according to claim 1 further comprising:
    e) for each path, providing access control information based on an access control policy for the structured document;
    f) storing the access control information in the table; and
    g) correlating the identifier for the node with the access control information associated with the path.

8. The computer readable medium according to claim 7 wherein the access control information associated with the path is an executable statement indicating who is granted or denied access to the node.

9. The computer readable medium according to claim 1 further comprising:
    e) for each path, determining schema information associated with the path;
    f) storing a reference to the schema information in the table; and
    g) correlating the identifier for the path with the reference to the schema information associated with the path.

10. The computer readable medium according to claim 1 further comprising:
    e) for each path, collecting statistical information associated with the path;
    f) storing the statistical information in the table; and
    g) correlating the identifier for the path with the statistical information associated with the path.

11. The computer readable medium according to claim 1 wherein the child pointer points to an in-lined character array.

12. The computer readable medium according to claim 1 wherein the child pointer points to itself.

13. A system for associating information related to a component in a structured document that is stored in its native format in a database system comprising:
    a) a computer system coupled to at least one data storage device;
    b) a database management system in the computer system;
    c) a storage mechanism in the database management system for generating a node slot array and a hierarchical node tree, wherein the hierarchical node tree comprises a plurality of nodes, wherein each node represents a component in the structured document, wherein each node comprises a header section and a child pointer section, wherein the child pointer section comprises a plurality of child pointers to minimize node size, and wherein at least one child pointer points to a node slot within the node slot array, which in turn, includes an entry which points to a node corresponding to the child node, wherein the storage mechanism comprises a path generator for generating a path associated with each node, wherein the path follows the hierarchical structure of the structured document from a root node to the node and wherein the storage mechanism stores in each node an identifier associated with the path; and
    d) a table in the data storage device, wherein the table correlates the identifier with information related to the associated path, wherein the information applies to the component represented by the node.

14. The system according to claim 13 wherein the storage mechanism further comprises a parser for parsing the structured document into a plurality of nodes and a node tree generator for linking each of the nodes via pointers to form the hierarchical node tree.

15. The system according to claim 13, wherein the storage mechanism stores each node in at least one record in the database, wherein each record comprises a plurality of node slots and each node slot includes a pointer pointing to a node.

16. The system according to claim 13 wherein the storage mechanism stores the identifier in the table.

17. The system according to claim 16 wherein the storage mechanism stores the path in the table and correlates the identifier with the path associated with the node.

18. The system according to claim 13 further comprising access control information for each path, wherein the access control information is based on an access control policy for the structured document, and wherein the storage mechanism stores the access control information in the table and correlates the identifier for the path with the access control information associated with the path.

19. The system according to claim 18 wherein the access control information associated with the path is an executable statement indicating who is granted or denied access to the node.

20. The system according to claim 13 further determining for each path schema information associated with the path, and wherein the storage mechanism stores a reference to the schema information in the table and correlates the identifier for the path with the reference to the schema information.

21. The system according to claim 13 further comprising means for collecting for each path statistical information associated with the path and wherein the storage mechanism stores the statistical information in the table and correlates the identifier for the path with the statistical information.

* * * * *